US009722805B2

(12) United States Patent
Suzuki

(10) Patent No.: US 9,722,805 B2
(45) Date of Patent: Aug. 1, 2017

(54) INTEGRATED SECURITY DEVICE AND SIGNAL PROCESSING METHOD USED FOR AN INTEGRATED SECURITY DEVICE

(71) Applicant: Daisuke Suzuki, Chiyoda-ku (JP)

(72) Inventor: Daisuke Suzuki, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 42 days.

(21) Appl. No.: 14/651,130

(22) PCT Filed: Dec. 11, 2012

(86) PCT No.: PCT/JP2012/082081
§ 371 (c)(1),
(2) Date: Jun. 10, 2015

(87) PCT Pub. No.: WO2014/091559
PCT Pub. Date: Jun. 19, 2014

(65) Prior Publication Data
US 2015/0312047 A1    Oct. 29, 2015

(51) Int. Cl.
*H04L 12/00* (2006.01)
*H04L 9/32* (2006.01)
(Continued)

(52) U.S. Cl.
CPC .............. *H04L 9/3278* (2013.01); *G09C 1/00* (2013.01); *H04L 9/0866* (2013.01); *H04L 2209/122* (2013.01)

(58) Field of Classification Search
CPC .................................................. H04L 2463/041
See application file for complete search history.

(56) References Cited

U.S. PATENT DOCUMENTS

2003/0204743 A1    10/2003   Devadas et al.
2006/0129335 A1*    6/2006   Niijima ............ G01R 31/31922
                                                                    702/35
(Continued)

FOREIGN PATENT DOCUMENTS

EP    2 525 489 A1    11/2012
JP    2005-523481 A    8/2005
(Continued)

OTHER PUBLICATIONS

Office Action issued on May 20, 2016 in Korean Patent Application No. 10-2015-7018156 with English translation.
(Continued)

*Primary Examiner* — Josnel Jeudy
(74) *Attorney, Agent, or Firm* — Oblon, McClelland, Maier & Neustadt, L.L.P.

(57) ABSTRACT

An integrated security device, including: an encryption/decoding processing unit for executing processing necessary for authentication by using a logic circuit that forms an encryption/decoding function; a selector for selecting signals whose number corresponds to a specific number of lines from among signals from a plurality of intermediate nodes of the logic circuit in accordance with a selection signal; and a signal processing unit having a function of detecting a glitch caused by the signals corresponding to the specific number of lines, for implementing both a function of generating a physical random number and a function of generating a device identifier by a physical characteristic based on the glitch detected by switch-selecting the signals corresponding to the specific number of lines.

17 Claims, 10 Drawing Sheets

(51) Int. Cl.
*G09C 1/00* (2006.01)
*H04L 9/08* (2006.01)

(56) References Cited

U.S. PATENT DOCUMENTS

| | | | |
|---|---|---|---|
| 2010/0146261 A1 | 6/2010 | Talstra et al. | |
| 2011/0119762 A1* | 5/2011 | Teglia | G06F 21/52 726/23 |
| 2011/0252189 A1* | 10/2011 | Kang | G06F 12/0246 711/103 |
| 2013/0226498 A1* | 8/2013 | Pedersen | G06F 11/0751 702/117 |
| 2015/0067895 A1* | 3/2015 | Vasyltsov | H04L 9/3278 726/32 |
| 2015/0278527 A1* | 10/2015 | Falk | G09C 1/00 726/25 |

FOREIGN PATENT DOCUMENTS

| | | |
|---|---|---|
| JP | 2009-524998 A | 7/2009 |
| JP | 2009-533741 A | 9/2009 |
| JP | 2010-527219 A | 8/2010 |
| JP | 4733924 B2 | 7/2011 |
| JP | WO2011/086688 A1 | 7/2011 |
| JP | 4913861 B2 | 4/2012 |
| JP | 5248328 B2 | 7/2013 |
| KR | 10-2008-0106180 A | 12/2008 |
| KR | 10-2012-0112557 A | 10/2012 |
| WO | 03/090259 A2 | 10/2003 |
| WO | 2007/087559 A2 | 8/2007 |
| WO | 2007/119190 A2 | 10/2007 |
| WO | 2009/002599 A2 | 12/2008 |
| WO | 2011/086688 A1 | 7/2011 |
| WO | 2012/095972 A1 | 7/2012 |

OTHER PUBLICATIONS

Extended European Search Report issued Jul. 20, 2016 in Patent Application No. 12889923.4.

Daisuke Suzuki, et al., "Device Key Generator using Glitch PUFs", The 29$^{th}$ Symposium on Cryptography and Information Security, Total 8 Pages, (Jan. 30-Feb. 2, 2012).

International Search Report Issued Feb. 19, 2013 in PCT/JP12/082081 Filed Dec. 11, 2012.

* cited by examiner

INTEGRATED SECURITY DEVICE AND SIGNAL PROCESSING METHOD USED FOR AN INTEGRATED SECURITY DEVICE

TECHNICAL FIELD

The present invention relates to a logic circuit for executing a security function such as authentication processing and encryption processing, and more particularly, to an integrated security device and a signal processing method to be used for an integrated security device, for providing generation of secret information used for encryption processing or an ID unique to a chip necessary to authenticate a device, a physical random number, and an encryption/decoding function, in the form of a small-scale logic circuit.

BACKGROUND ART

In recent years, as more built-in devices represented by mobile phones are becoming subjected to networking, the built-in device is increasingly demanded to perform processing involving information security in order to conceal data handled by the built-in device, maintain integrity thereof, and authenticate the built-in device itself. Such processing involving the information security is implemented by an encryption algorithm or an authentication algorithm.

Here, consideration is given to a system in which two LSIs perform authentication to confirm that one device to which the other device is connected is valid. As a specific example thereof, there is a conceivable case where an LSI mounted to a mobile phone main body authenticates an LSI mounted to a battery thereof to confirm that the battery is allowed to be connected thereto.

In general, such a function is implemented by the following authentication protocol.

(1) In advance, secret information K is stored in each of the LSI mounted to the mobile phone main body and the LSI mounted to the battery.

(2) At a time of authentication, the mobile phone main body sends a random number C to a battery side. At the same time, an encryption function Enc(C, K)=R is executed, and a result thereof is held as Rm.

(3) On the battery side, in the same manner as on the main body side, the encryption function Enc(C, K)=R is executed for the random number C that has been sent to the battery, and the execution result is transmitted to the main body side as Rs.

(4) On the main body side, it is verified whether or not Rs received from the battery side and Rm calculated by itself are equal to each other, and the authentication is determined to be OK when equal and NG when different.

It is a point of this protocol that the authentication can be successfully passed as long as the mobile phone main body and the battery have the same secret information K.

It is a major premise in executing this protocol that the respective device "securely" hold the secret information K. The word "securely" means that it is difficult for a person who is not legally allowed to access the device to read or tamper with secret information.

As a method of securely holding the secret information, there is a technology called a physical unclonable function (PUF). One of major features of the PUF resides in that the secret information K is not held within the device as non-volatile digital data. Further, there are several embodiments of such PUF (see, for example, Patent Literatures 1 and 2).

Here, when the protocol formed of (1) to (4) described above is divided into more detailed functions, it is found that at least the following three functions are necessary.

<Function 1> Function of holding the secret information K securely within each device.

<Function 2> Function of generating the random number C.

<Function 3> Function of processing the encryption function Enc.

<Function 1> is a function that can be achieved by the above-mentioned PUF. Further, <Function 2> needs generation of a random number that does not have reproducibility, and therefore needs a physical random number generator. In addition, in regard to <Function 3>, processing for a block cipher algorithm such as advanced encryption standard (AES of the U.S. standard cryptography) is given as a representative example.

CITATION LIST

Patent Literature

[PTL 1] JP 2009-524998 A
[PTL 2] JP 2009-533741 A

Non Patent Literature

[NPL 1] Daisuke Suzuki and Koichi Shimizu. The glitch puf: a new delay-puf architecture exploiting glitch shapes. In Proceedings of the 12th international conference on Cryptographic hardware and embedded systems, CHES'10, pages 366-382, Berlin, Heidelberg, 2010. Springer-Verlag.

SUMMARY OF INVENTION

Technical Problem

However, the related arts have the following problems.

In order to implement the above-mentioned authentication protocol, it is general to implement three circuits of a PUF circuit, a physical random number generation circuit, and an encryption circuit respectively in separate LSIs and to integrate functions thereof by a control circuit, a CPU, or the like.

In this case, it is necessary to implement three different circuits separately, which raises problems in that a circuit scale becomes large and that separate tests are required for the respective circuits.

The present invention has been made in order to solve such problems as described above, and it is an object thereof to obtain an integrated security device and a signal processing method to be used for an integrated security device, which are capable of integrating three different circuits into an identical circuit, reducing the circuit scale, and facilitating the tests.

Solution to Problems

According to one embodiment of the present invention, there is provided an integrated security device, including: an encryption/decoding processing unit for executing processing necessary for authentication by using a logic circuit that forms an encryption/decoding function; a selector for selecting signals whose number corresponds to a specific number of lines from among signals from a plurality of intermediate nodes of the logic circuit in accordance with a selection signal from outside; and a signal processing unit having a function of detecting a glitch caused by the signals corresponding to the specific number of lines selected by the selector, for switch-selecting the signals corresponding to the specific number of lines by supplying the selector with the signal from the outside, to implement both a function of generating a physical random number and a function of generating a device identifier by a physical characteristic based on the glitch detected in accordance with the switch-selected signals corresponding to the specific number of lines.

Further, according to one embodiment of the present invention, there is provided a signal processing method to be used for an integrated security device, including: an encryption/decoding processing step of executing processing necessary for authentication by using a logic circuit that forms an encryption/decoding function; a selecting step of selecting signals whose number corresponds to a specific number of lines from among signals from a plurality of intermediate nodes of the logic circuit by switching a selector in accordance with a selection signal from outside; and a signal processing step of executing a function of detecting a glitch caused by the signals corresponding to the specific number of lines selected by the selecting step, and of switch-selecting the signals corresponding to the specific number of lines by supplying the selector with the signal from the outside, to execute both a function of generating a physical random number and a function of generating a device identifier by a physical characteristic based on the glitch detected in accordance with the switch-selected signals corresponding to the specific number of lines.

Advantageous Effects of Invention

According to one embodiment of the present invention, the circuit initially mounted for processing of the encryption function is used to implement each of the random logic that operates as the PUF and the random logic that operates as the physical random number generator, to thereby be able to obtain the integrated security device and the signal processing method to be used for an integrated security device, which are capable of integrating three different circuits into an identical circuit, reducing a circuit scale, and facilitating tests.

DESCRIPTION OF EMBODIMENTS

Figure 1:
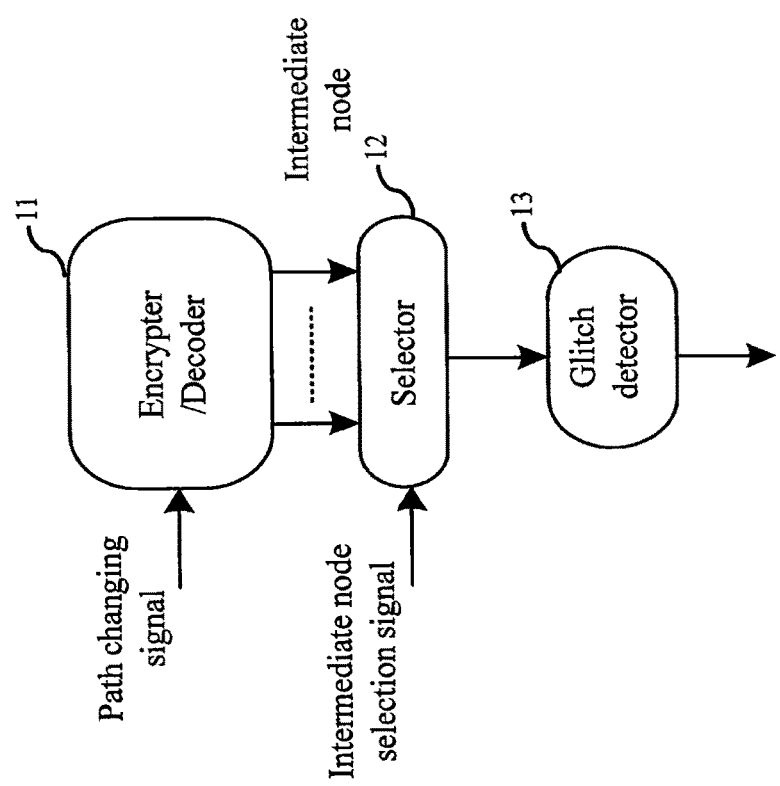
FIG. 1 is a block diagram of a security device obtained by integrating a function of PUF, a function for random number generation, and a function of encryption according to a first embodiment of the present invention.

Now, an integrated security device and a signal processing method to be used for an integrated security device according to preferred embodiments of the present invention are described with reference to the accompanying drawings.

First, a fuzzy extractor and a glitch PUF serving as technical premises are described before descriptions are made of the embodiments of the present invention.

Description of the Fuzzy Extractor

In general, it is difficult to use a response of the PUF as a key to be used for cryptography as it is. This is because it is difficult to guarantee that the response of the PUF includes no error every time and that the responses follow a uniform distribution. Therefore, normally, the fuzzy extractor (hereinafter referred to as "FE") is used to perform key generation. Some versions exist for a method of forming the FE, and in the present application, a description is made of a configuration formed based on code offset.

As an algorithm 1 and an algorithm 2, pieces of processing of the FE formed based on the code offset are collectively shown below in Table 1 and Table 2, respectively.

TABLE 1

| algorithm 1: key generation processing Gen performed by FE |
|---|
| Setting: (n,k,2t + 1) error correction code C , general-purpose hash function $h_A$<br>Input: (l·n)-bit PUF response W = $(w_1,w_2,...,w_l)$.<br>Output: (K,S) ← Gen(W) , u-bit key K , (l·n)-bit auxiliary data S = $(s_1,s_2,...,s_l)$<br>1: i = 1 to l do<br>2:    generate k-bit random number $r_i$<br>3:    $c_i$ ← $Encode_C(r_i)$<br>4:    $s_i$ ← $w_i \oplus c_i$<br>5: end for<br>6:  K ← $h_A(w_1,w_2,...,w_l)$<br>7: return K,S |

TABLE 2

| algorithm 2: key reproduction processing Rep performed by FE |
|---|
| Setting: (n,k,2t + 1) error correction code C , general-purpose hash function $h_A$<br>Input: ( l·n )-bit PUF response W' = $(w'_1,w'_2,...,w'_l)$ ,( l·n )-bit auxiliary data S = $(s_1,s_2,...,s_l)$.<br>Output: K ← Rep(W',S) , u-bit key K .<br>1: i = 1 to l do<br>2:    $c'_i$ ← $w'_i \oplus s_i$<br>3:    $c_i$ ← $Decode_C(c'_i)$ |

TABLE 2-continued algorithm 2: key reproduction processing Rep performed by FE

```
4:     w_i ← c_i ⊕ s_i
5: end for
6:    K ← h_A(w_1,w_2,...,w_l)
7: return K,S
```

The algorithm 1 is processing for generating a key corresponding to an initial key for the FE, and the algorithm 2 is processing for reproducing a key for generating the same bit string as the initial key.

Encode$_C$ and Decode$_C$ within the algorithm 1 and the algorithm 2, respectively, represent encoding processing and correction processing within an error correction code C. An agreement between the generated key and the reproduced key is guaranteed by the following expression (1) in terms of a Hamming distance of a PUF response within the algorithm 1 and the algorithm 2.

[Math. 1]

$$\forall i \in \{1, \ldots, l\}, dis_{Ham}(w_i, w'_i) \leq t \quad (1)$$

Further, assuming that an information amount between chips held by a k-bit PUF output is k', the following expression (2) is an appropriate design parameter.

[Math. 2]

$$l = \lceil u/k' \rceil \quad (2)$$

Description of the Glitch PUF

The glitch PUF (hereinafter referred to as "GPUF") is one method of forming a PUF that uses a phenomenon called "glitch" caused by a relationship in delay between input/output signals of respective gates forming a logic circuit.

Figure 9:
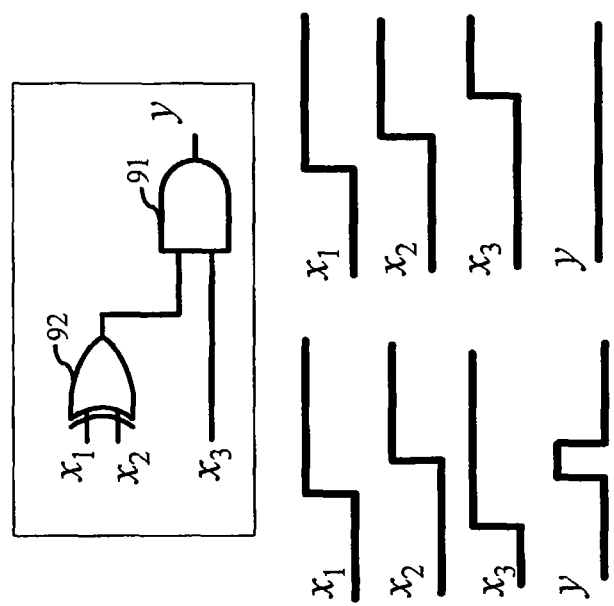
FIG. 9 is an example of a logic circuit for describing a principle of a glitch PUF.

FIG. 9 is an example of a logic circuit for describing a principle of the glitch PUF, and exemplifies a case where the logic circuit is formed of an AND circuit 91 and an XOR circuit 92. Now, a simple logic circuit illustrated in FIG. 9 is used to describe the principal of the glitch PUF. In such a circuit as illustrated in FIG. 9 for performing logical operations of the AND circuit 91, the XOR circuit 92, and the like for a plurality of input signals, transient signal transitions called "glitch" generally occur due to differences in delay among the respective signals.

In FIG. 9, when input signals (x1, x2, and x3) all change from "0" to "1", a glitch having a protrusion shape first occurs in an output from the XOR circuit 92 due to a time difference between the changes of the signals x1 and x2. Then, when the change of the signal x3 reaches the AND circuit 91 earlier than the above-mentioned glitch, the above-mentioned glitch propagates to an output from the AND circuit 91 (see the waveforms shown on the left side of FIG. 9). In contrast, when the change of x3 reaches the AND circuit 91 later than the above-mentioned glitch, the above-mentioned glitch does not propagate to the output from the AND circuit 91 (see the waveforms shown on the right side of FIG. 9).

In addition, even in a case where x3 is earlier, depending on a transistor characteristic of the AND circuit 91, a glitch having a short width may fail to propagate to the output. However, when a glitch is limited to the one having a sufficiently long width, a glitch shape thereof is determined by a relative relationship in delay in the same manner as in a case of a delay-PUF such as an arbiter-PUF, and it is expected that the shape is maintained even when an operating environment changes.

A method of forming the GPUF is indicated in Non Patent Literature 1. Here, as an algorithm 3 and an algorithm 4, descriptions obtained by converting an operation of the GPUF into pseudo codes are shown below as Table 3 and Table 4, respectively.

TABLE 3 algorithm 3: operation of GPUF performed in key generation processing

Setting: parity $b_i = G2R_j(x'_i \to x_i)$ of rising edge in each output signal that occurs depending on state transition $x'_i \to x_i$ of input signal relative to random logic f with m-bit input and n-bit output
n-bit data $b_i = (b_{i,1}, b_{i,2}, \ldots, b_{i,n})_2$.
Input: (l·m)-bit data $X = (x_1, x_2, \ldots, x_l)$, repeat count $cnt_{re}$, stability determination threshold value $th_{err}$.
Output: $(W, S_{mask}) \leftarrow GPUF_{Gen}(X, cnt_{re}, th_{err})$, (l·n)-bit PUF response $W = (w_1, w_2, \ldots, w_l)$, (l·n)-bit auxiliary data $S_{mask} = (s_1, s_2, \ldots, s_l)$.
```
1:  i = 1 to l do
2:     cnt[1 : n] ← all0
3:     j = 1 to cnt_re do
4:        b_i = G2R_j(x'_i → x_i)
5:        k = 1 to n do
6:           cnt[k] ← cnt[k] + b_{i,k}
7:        end for
8:     end for
9:     j = 1 to n do
10:       if(cnt[j] ≤ th_err) then
11:          w_{i,j} ← 0, s_{i,j} ← 1
12:       else if(cnt_re-1-th_err ≤ cnt[j])
13:          w_{i,j} ← 1, s_{i,j} ← 1
14:       else
15:          s_{i,j} ← 0
16:       end if
17:    end for
18: end for
19: return W, S_mask ;
```

TABLE 4 algorithm 4: operation of GPUF performed in key reproduction processing

Setting: parity $b_i = G2R_j(x'_i \to x_i)$ of rising edge in each output signal that occurs depending on state transition $x'_i \to x_i$ of input signal relative to random logic f with m-bit input and n-bit output
n-bit data $b_i = (b_{i,1}, b_{i,2}, \ldots, b_{i,n})_2$.
Input: (l·m)-bit data $X = (x_1, x_2, \ldots, x_l)$, (l·n)-bit auxiliary data $S_{mask} = (s_1, s_2, \ldots, s_l)$, repeat count $cnt_{re}$.
Output: $W \leftarrow GPUF_{Rep}(X, S_{mask}, cnt_{re})$, (l·n)-bit PUF response $W = (w_1, w_2, \ldots, w_l)$.
```
1:  i = 1 to l do
2:     cnt[1 : n] ← all0
3:     j = 1 to cnt_re do
4:        b_i = G2R_j(x'_i → x_i)
5:        k = 1 to n do
6:           cnt[k] ← cnt[k] + b_{i,k}
7:        end for
8:     end for
9:     j = 1 to n do
10:       if(cnt[j] < cnt_re / 2) then
11:          w_{i,j} ← 0
12:       else
13:          w_{i,j} ← 1
14:       end if
15:    end for
16:    w_i ← w_i ∩ s_i
17: end for
19: return W ;
```

The algorithm 3 represents the operation of the GPUF performed at a time of key generation processing. At the time of key generation processing, in order to lower an error rate of the PUF response, processing for determining whether an edge for the same input state transition has an even or odd number a plurality of times and examining whether or not an output therefrom is stable is performed. Specifically, iterative processing is performed the number of times defined by a repeat count $cnt_{re}$.

After that, processing for performing an examination relating to stability of a bit with a stability determination threshold value $th_{err}$ used as a requirement for each output bit and handling a bit that does not satisfy the requirement as "0" at times of the key generation and key reproduction by setting a bit value of auxiliary data $S_{mask}$ corresponding to the bit to "0" is performed.

In contrast thereto, in the operation of the glitch PUF at a time of key reproduction processing indicated in the algorithm 4, the iterative processing is carried out in the same manner as at the time of the generation except that the final response is determined by majority decision and mask processing using $S_{mask}$.

Figure 10:
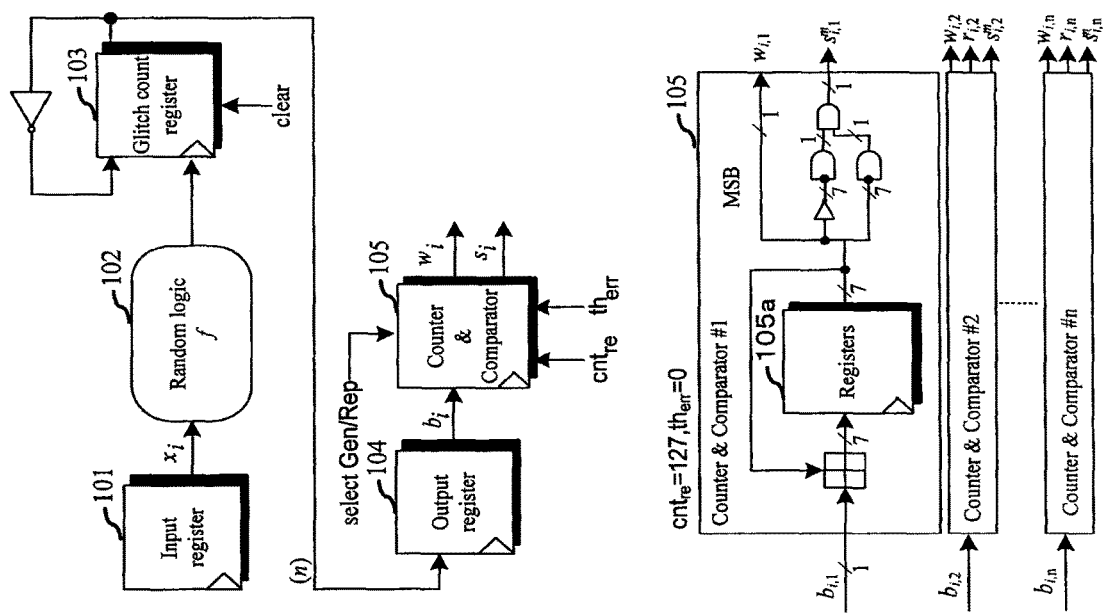
FIG. 10 is an exemplary configuration diagram of a GPUF circuit.

FIG. 10 is an exemplary configuration diagram of a GPUF circuit. In FIG. 10, an "input register" 101 is a register for storing $x'_i$ and $x_i$ within the algorithms 3 and 4. Further, in FIG. 10, a "random logic f" 102 is a combinational circuit for processing a random logic f within the algorithms 3 and 4.

Further, in FIG. 10, a "glitch count register" 103 is a flip-flop (FF) using a signal for determining whether a rising edge has an even or odd number as a clock. This FF is reset by a "clear" signal illustrated in FIG. 10 immediately before performing determination processing.

Further, in FIG. 10, an "output register" 104 is a register for storing again a determination result $b_i$ of whether the rising edge stored in the "glitch count register" 103 has an even or odd number.

In addition, in FIG. 10, a "counter & comparator" 105 includes registers 105a for managing the number of occurrences of 0 and 1 of each bit based on the determination result $b_i$, and performs calculation of a PUF response $w_{ii}$ and auxiliary data $s^m_{ii}$ in accordance with an occurrence function.

Now, for the sake of a better understanding, an operation illustrated in FIG. 10 is described by taking a specific example.

It is assumed that the "input register" 101 illustrated in FIG. 10 is an 8-bit register and that 0x00 being held is changed to 0x55. This operation corresponds to within the algorithms 3 and 4.

At this time, there is a change in an input to the "random logic f" 102 serving as the combinational circuit, which also causes a change in an output therefrom. The output is subjected to a behavior having different presence/absence of a pulse, as described above with reference to FIG. 9, for each LSI due to variations in circuit delays of the "random logic f" 102.

Here, assuming that $cnt_{re}=7$ and $th_{err}=0$, the input change of 0x00→0x55 is executed seven times. In the algorithm 3, when all the pulses generated in accordance with the input change 0x00→0x55 for the seven times have the same parity, $s_{ii}\leftarrow 1$ is established. On the other hand, when the parities of the pulses differ even once, $s_{ii}\leftarrow 0$ is established. Further, $w_{ii}\leftarrow 0$ is established when the pulses have even numbers all seven times, while $w_{ii}\leftarrow 1$ is established when the pulses have odd numbers all seven times.

The above-mentioned determination is processed by the "counter & comparator" 105 illustrated in FIG. 10. For example, in the algorithm 3, when "1" is determined all seven times, "1, 1, 1" is stored in a 3-bit counter of the "counter & comparator" 105. Therefore, an AND result for each of the bits is "1", and $s_{ii}\leftarrow 1$ is established.

Further, when "0" is determined all seven times, "0, 0, 0" is stored in the 3-bit counter. Therefore, a NAND result thereof is "1", and $s_{ii}\leftarrow 1$ is established. When the parities of the pulses differ even once, a 3-bit register does not exhibit all the same values, and hence $s_{ii}\leftarrow 0$ is established.

Further, in the algorithm 4, when the response corresponding to the same input change for the seven times is "1" four or more times, $w_{ii}\leftarrow 1$ is established, while $w_{ii}\leftarrow 0$ is established when the response is "0" four or more times. In any one of the cases, a determination function can be implemented by outputting an MSB of the counter.

As described above, in the algorithm 3, when the input change returns as stable outputs as to have the same response all seven times, $s_{ii}\leftarrow 1$ is established, and otherwise $s_{ii}\leftarrow 0$ is established. Further, in the algorithm 4, the majority decision is performed for the response corresponding to the input change determined to return the stable response in the algorithm 3, thereby determining the response.

The stability of the response of the GPUF, namely, an error probability of the response bit, depends on a circuit configuration of the "random logic f" 102. This bit error rate tends to rise as the number of logic stages becomes larger. For example, there is such dependency that the error probability is 1% with a given number of logic stages while the error probability becomes 10% as the number of logic stages increases.

With consideration given to the descriptions made above relating to the fuzzy extractor and the glitch PUF serving as technical premises, the embodiments of the present invention are described below with reference to the accompanying drawings.

First Embodiment

FIG. 1 is a block diagram of a security device obtained by integrating a function of PUF, a function for random number generation, and a function of encryption according to a first embodiment of the present invention. An encrypter/decoder 11 is a circuit block for performing normal encryption/decoding processing. Further, signals are output from a plurality of intermediate nodes of a logic circuit forming the encrypter/decoder 11 to the outside of the circuit block.

A selector 12 selects signals whose number corresponds to a specific number of lines from among the signals output from the encrypter/decoder 11 through the plurality of intermediate nodes. In addition, a glitch detector 13 performs glitch detection for the signals selected by the selector 12, to output a detection result thereof.

Note that, a path changing signal input to the encrypter/decoder 11 is a signal for switching the circuit through which data processed by the encrypter/decoder 11 is to pass. Further, the intermediate node selected by the selector 12 is switched based on a value of an intermediate node selection signal input to the selector 12.

In this manner, by using the intermediate node selection signal, it is possible to switch between a signal from the intermediate node for performing the glitch detection when operating as the PUF and a signal from the intermediate node for performing the glitch detection when operating as a physical random number, which allows the same glitch detector 13 to be used.

Second Embodiment

Figure 2:
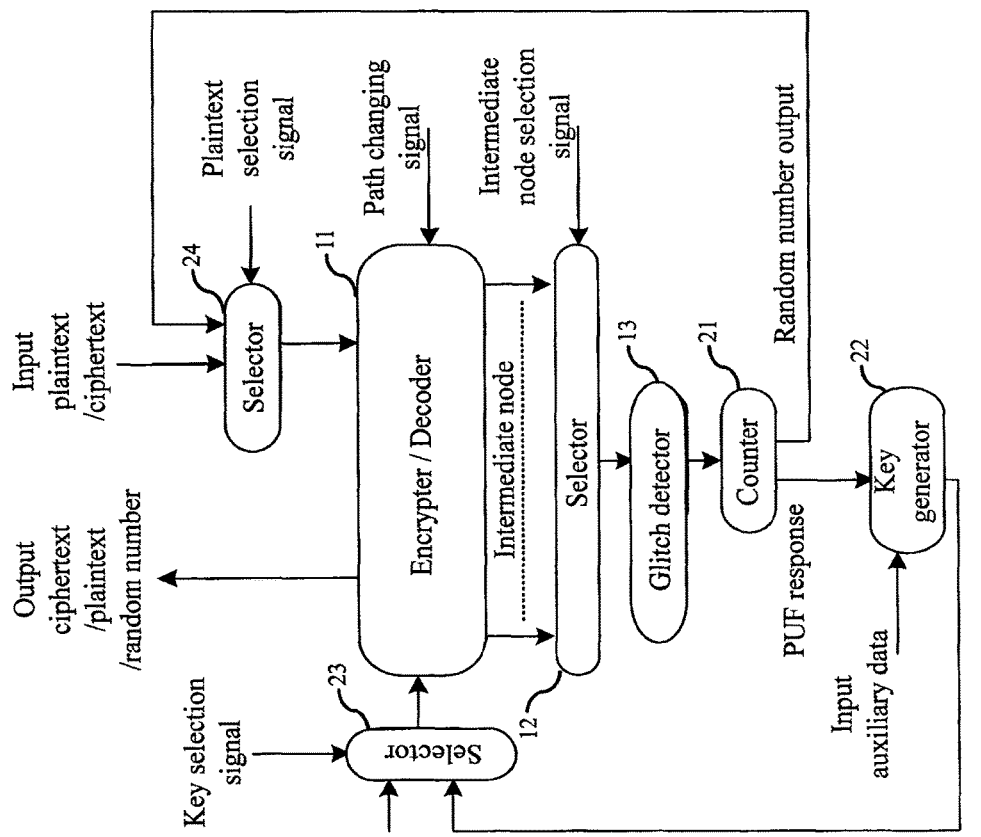
FIG. 2 is a block diagram of a security device obtained by integrating a function of PUF, a function for random number generation, and a function of encryption according to a second embodiment of the present invention.

In a second embodiment of the present invention, a description is made of an aspect in which the configuration illustrated in FIG. 1 according to the above-mentioned first embodiment is made more concrete. FIG. 2 is a block diagram of a security device obtained by integrating a function of PUF, a function for random number generation, and a function of encryption according to the second embodiment of the present invention.

A counter 21 determines the stability of the result of the glitch detection performed by the glitch detector 13 as described above. At this time, the stability is determined by using a most significant bit of the counter 21. For example, in a case of the majority decision, frequencies of "0" and "1" can be determined by the MSB. Further, in this second embodiment, a least significant bit of the counter 21 is used for a random number.

The response of the PUF serves as an input to a key generator 22 in accordance with the algorithms 1 and 2. A first selector 23 selects one of a plurality of signals, which are read as an output from the key generator 22, in accordance with a key selection signal from the outside, and outputs the selected one to the encrypter/decoder 11. In this manner, the first selector 23 can supply the encrypter/decoder 11 with a device identifier generated by a physical characteristic.

On the other hand, a random number output corresponding to an output of the least significant bit of the counter 21 is read into a second selector 24. Then, the second selector 24 selects any one of plaintext/ciphertext inputs from the outside in accordance with a plaintext selection signal from the outside, and outputs the selected one to the encrypter/decoder 11 along with the random number output read from the counter 21.

As a result, the encrypter/decoder 11 can process an encryption function based on the device identifier generated by the physical characteristic and on the random number.

Third Embodiment

Figure 3:
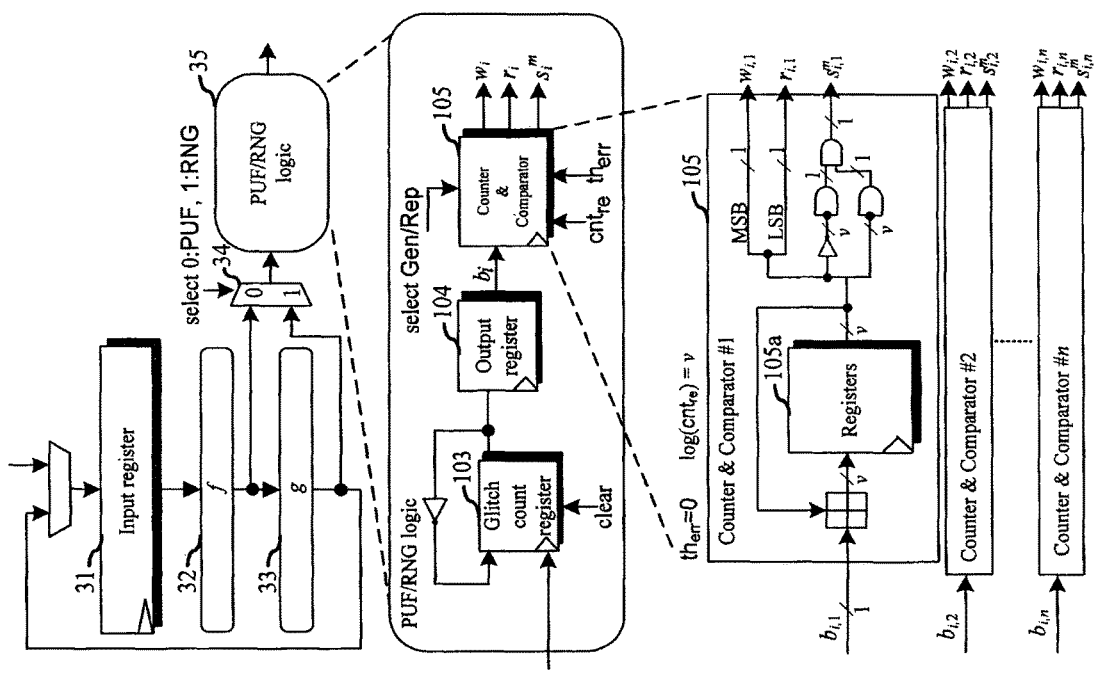
FIG. 3 is a block diagram of a security device obtained by integrating a function of PUF, a function for random number generation, and a function of encryption according to a third embodiment of the present invention.

FIG. 3 is a block diagram of a security device obtained by integrating a function of PUF, a function for random number generation, and a function of encryption according to a third embodiment of the present invention. First, a description is made of an encryption function Enc. Note that, here, for the sake of simplicity in description, secret information K used in the encryption function is omitted.

A general encryption function is formed of iteration of sub-functions. For example, in the example of FIG. 3, the processing of the encryption function Enc is defined by the iterative processing of a sub-function f 32 and a sub-function g 33. In other words, assuming that a repeat count is n, processing of:

$$H_1 = g(f(P));$$

is performed for a plaintext P stored in an "input register" 31 within FIG. 3, and a value of the "input register" 31 is updated to H1.

In the same manner, processing of:

$$H_2 = g(f(H_1));$$

is performed, and after such processing is repeated n times, $$C \rightarrow H_n = g(f(H_{n-1}));$$

stored in the "input register" 31 is set as a ciphertext C, to finish the processing of the encryption function.

At this time, in the third embodiment, signal lines of the sub-function f 32 and the sub-function g 33 are drawn from a circuit path for performing the processing of the encryption function Enc, and a selector 34 that allows each of the signal lines to be selected is provided. At this time, an output from the sub-function f 32 is selected to operate the function of PUF, while the signal line of the sub-function g 33 is selected to operate a function of a physical random number generator.

In other words, the signal line whose number of logic stages are determined only by the sub-function f 32 is handled as a random logic of the PUF, while a composite function g·f having a larger number of logic stages is handled as a random logic used for the physical random number generator.

When FIG. 3 operates as the PUF, the "input register" 31 that stores the plaintext and an intermediate value $H_i$ in the encryption processing functions in the same manner as the "input register" 101 described above with reference to FIG. 10. Further, the sub-function f 32 illustrated in FIG. 3 functions in the same manner as the "random logic f" 102 described above with reference to FIG. 10.

In the subsequent part, the implementation methods of carrying out FIG. 10 and FIG. 3 agree with each other. In other words, a "PUF/RNG logic" 35 illustrated in FIG. 3 is formed of the "glitch count register" 103, the "output register" 104, and the "counter & comparator" 105 described above with reference to FIG. 10.

The respective inputs $X = (x1, x2, \ldots, \text{and } x1)$ within the algorithms 3 and 4 are updated by setting, as the next inputs, the ciphertext C obtained by encryption using the plaintext P and a key K or the intermediate value $H_i$ thereof.

As an algorithm 5, an operation as the physical random number generator within FIG. 3 is shown below as Table 5.

TABLE 5 algorithm 5: physical random number generation performed by GPUF

Setting: parity $b_i = G2R_f(x'_i \rightarrow x_i)$ of rising edge in each output signal that occurs depending on state transition $x'_i \rightarrow x_i$ of input signal relative to random logic f with m-bit input and n-bit output
n-bit data $b_i = (b_{i,1}, b_{i,2}, \ldots, b_{i,n})_2$.
Input: m-bit data x',x, repeat count $cnt_{re}$.
Output: $r \leftarrow \text{GPUF}(x, cnt_{re})$, n-bit random number $r = (r_1, r_2, \ldots, r_n)_2$.
1:   i = 1 to $cnt_{re}$ do
4:       $b_i = G2R_f(x' \rightarrow x)$
5:       j = 1 to n do
6:          cnt[j] ← cnt[j] + $b_{i,j}$
7:       end for
8:   end for
9:   i = 1 to n do
10:      $r_i \leftarrow$ cnt[i] mod 2
11 end for
19: return r ;

To summarize the algorithm 5, a limitation is imposed on the state transition of the input signal within the algorithm 3 or the algorithm 4, the operation of the GPUF is performed, and as the subsequent response, processing for outputting an LSB of the counter is performed instead of the majority decision. Accordingly, the algorithm 5 can be implemented only by adding the function of outputting signals to the circuits for performing the processing of the algorithm 3 and the algorithm 4.

Figure 4:
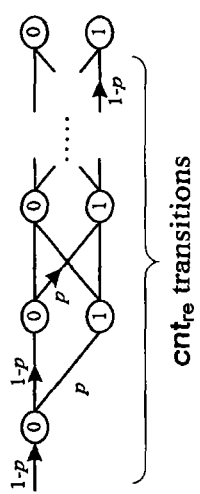
FIG. 4 is a model of a binary symmetric channel according to the third embodiment of the present invention.

Further, FIG. 4 is a model of a binary symmetric channel according to the third embodiment of the present invention. Assuming the binary symmetric channel illustrated in FIG. 4 as a model (namely, model in which a probability of transition from "0" to "1" or "1" to "0" is represented by p and a probability of transition from "0" to "0" or "1" to "1" is represented by 1−p), a bit inversion probability within the algorithm 5 is represented by the following expression (3).

[Math. 3]

$$\sum_{k=0}^{\lfloor cnt_{re}/2 \rfloor} \binom{cnt_{re}}{2k+1} p^{2k+1}(1-p)^{cnt_{re}-(2k+1)}. \quad (3)$$

When $cnt_{re}$ is large, the above-mentioned expression (3) converges to 0.5 even with p that is small. For example, when $cnt_{re}$=255, the above-mentioned calculation result is 0.49999992976191 with p=0.03, and sufficient random number property (randomness) can be obtained.

It is a point of FIG. 3 that a random logic that operates as the PUF and a random logic that operates as the physical random number generator are each implemented by using the circuits (corresponding to the sub-functions f and g) initially implemented for the processing of the encryption function Enc and are switched depending on how large the numbers of logic stages of the respective random logics are. In addition, the point resides in that an input update of the PUF is scheduled by the encryption function.

Fourth Embodiment

The above-mentioned third embodiment is configured so that the sub-function f and the sub-function g of the encryption function Enc are used as the random logic of the PUF and the physical random number generator as they are. However, when the numbers of logic stages of the sub-function f and the sub-function g are small, it is conceivable that a sufficient bit error rate cannot be obtained and that the random number property becomes insufficient in spite of the encryption function Enc functioning as the PUF.

Therefore, in a fourth embodiment of the present invention, a description is made of a configuration for aiming at performing an operation for obtaining appropriate random number property by adding a small-scale circuit to the circuit configuration of the encryption function Enc.

Figure 5:
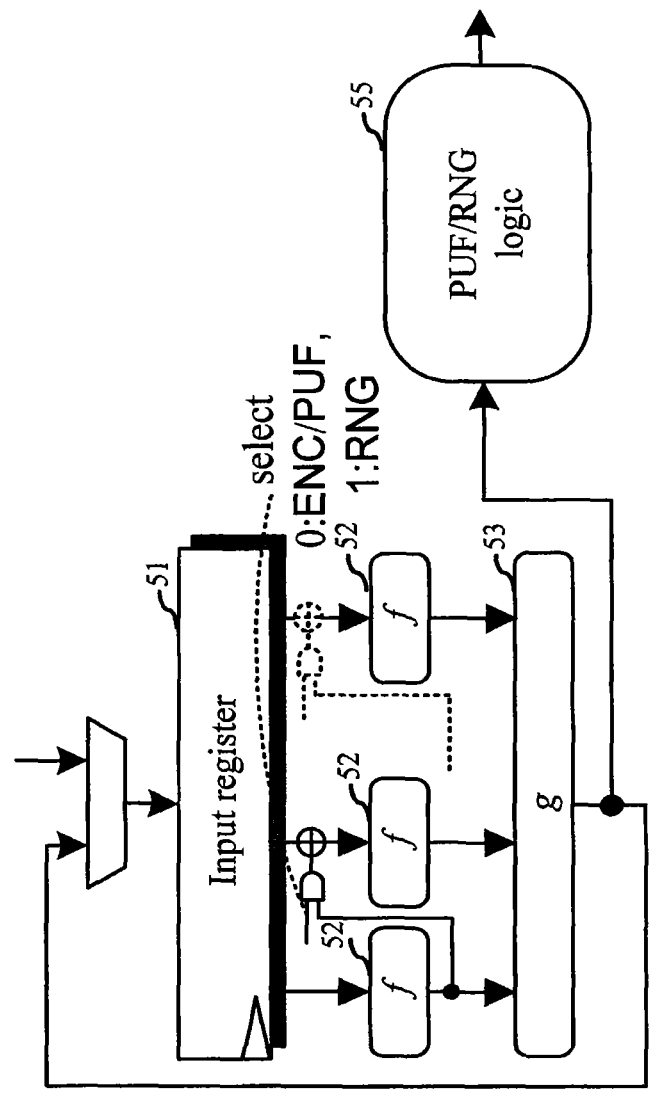
FIG. 5 is a block diagram of a security device obtained by integrating a function of PUF, a function for random number generation, and a function of encryption according to a fourth embodiment of the present invention.

FIG. 5 is a block diagram of a security device obtained by integrating a function of PUF, a function for random number generation, and a function of encryption according to the fourth embodiment of the present invention. In this configuration illustrated in FIG. 5, it is assumed that the sub-function f of the encryption function Enc is processing performed in given divided units. For example, in a case of a block cipher, substitution processing such as S-box corresponds to this processing.

At this time, as illustrated in FIG. 5, AND and XOR gates are used to provide a path for feeding back an output from a given sub-function f52 to an input to a different sub-function f52. In this case, assuming that the input signal of the AND gate is "0", FIG. 5 is equivalent to an arithmetic operation necessary for the encryption function Enc. On the other hand, assuming that the input signal of the AND gate is "1", FIG. 5 is equivalent to an arithmetic operation necessary for physical random number generation, and a circuit path having the number of logic stages corresponding to two stages of the sub-function f is formed.

With this configuration, even when the initially provided encryption function Enc has a small number of logic stages, it is possible to increase the number of logic stages while maintaining a functionality of the original encryption function.

Fifth Embodiment

Figure 6:
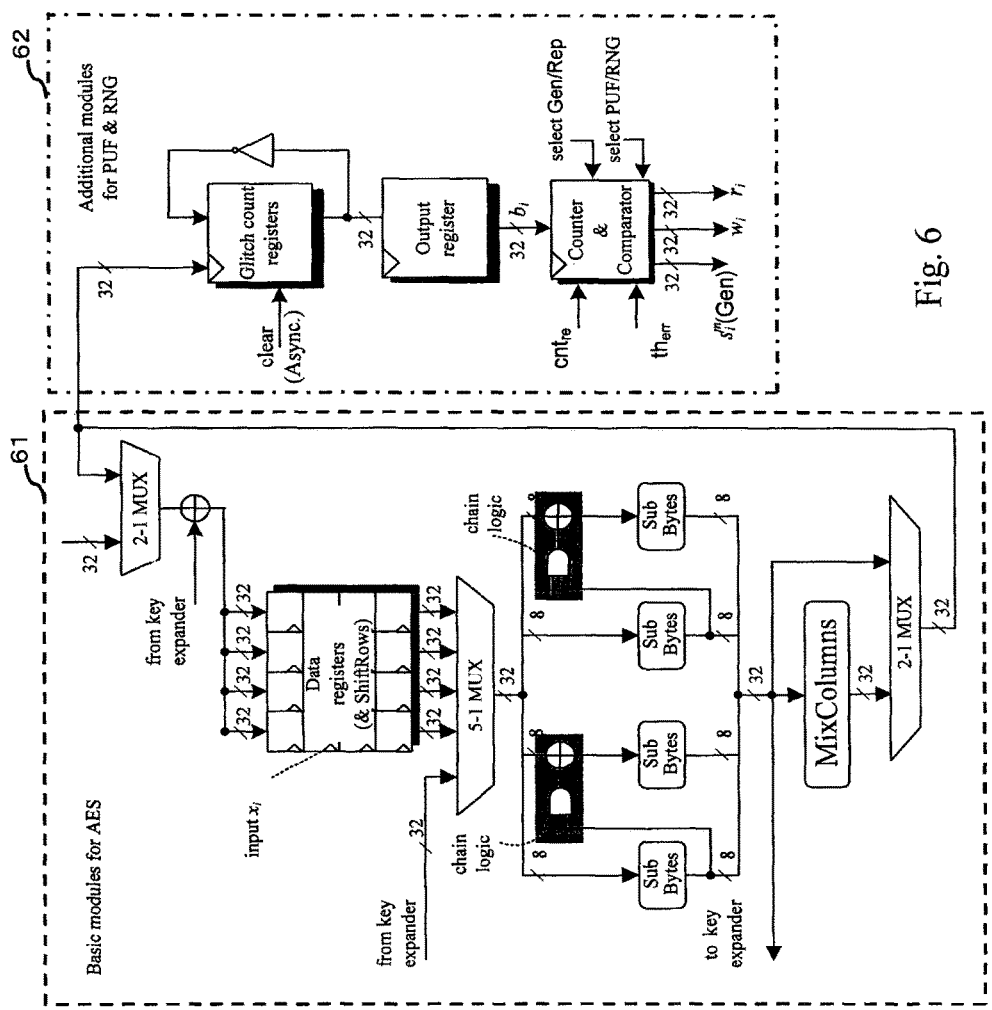
FIG. 6 is a block diagram of a security device obtained by integrating a function of PUF, a function for random number generation, and a function of encryption according to a fifth embodiment of the present invention.

In a fifth embodiment of the present invention, a description is made of a configuration obtained by making the above-mentioned fourth embodiment more concrete. FIG. 6 is a block diagram of a security device obtained by integrating a function of PUF, a function for random number generation, and a function of encryption according to the fifth embodiment of the present invention. In the fifth embodiment, a configuration that assumes the AES of the U.S. standard cryptography as the encryption function Enc is employed.

In FIG. 6, a part surrounded by the dotted line on the left side indicates "basic modules for the AES" 61 serving as the circuit initially necessary to implement a function of the AES, while a part surrounded by the dash-dot line on the right side indicates "additional modules for PUF & RNG" 62 serving as the circuit to be added for the PUF and the random number generation. A basic operation is the same as that of FIG. 2 described above, and it is possible to switch between the operations of the AES and the PUF and the function of the random number generation by switching "0" and "1" of the input to the AND gate of the logic indicated as "chain logic" in FIG. 6.

Figure 7:
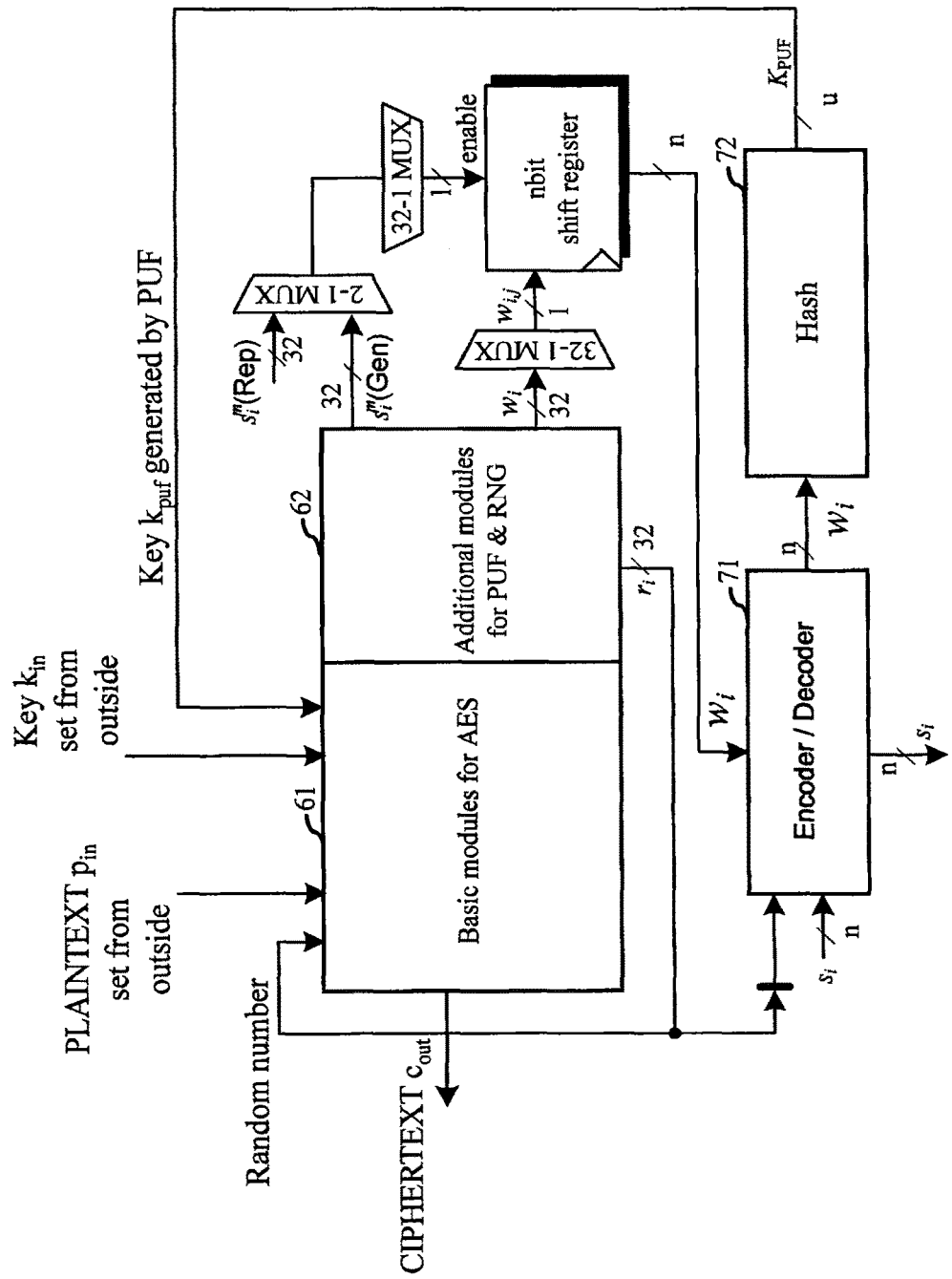
FIG. 7 is a block diagram illustrating a configuration in which a function of a fuzzy extractor is added to FIG. 6 according to the fifth embodiment of the present invention and a key generation function using the PUF is added thereto.

FIG. 7 is a block diagram illustrating a configuration in which a function of a fuzzy extractor is added to the configuration of FIG. 6 according to the fifth embodiment of the present invention and a key generation function using the PUF is added thereto. By the configuration illustrated in FIG. 7, the following three functions required for an authentication protocol are all implemented.

<Function 1> Holding the secret information K securely within each device.

<Function 2> Generating a random number C.

<Function 3> Processing the encryption function Enc.

Note that, this operation illustrated in FIG. 7 follows the algorithms 1 and 2.

Next, a description is made of an operation of the authentication protocol using the module of this embodiment.

(Operation 1) In accordance with the algorithm 4, the module of this embodiment performs the operation as the PUF, and the "additional modules for PUF & RNG" 62 generate a response w of the PUF.

(Operation 2) In accordance with the algorithm 2, a key $K_{PUF}$ is generated by an "encoder/decoder" 71 and a "hash" 72 from the response w of the PUF and auxiliary data S and $S_{mask}$, and is loaded into the "basic modules for AES" 61 serving as an AES circuit of the module of this embodiment.

(Operation 3) The "basic modules for AES" 61 load data D=Enc(K, $K_{PUF}$) obtained by encrypting an authentication key K stored in a non-secure area with the key $K_{PUF}$ into the module of this embodiment as the ciphertext, and decode the data D into the authentication key K with K=Dec(D, $K_{PUF}$), and load the authentication key into the module of this embodiment as a key.

(Operation 4) The "basic modules for AES" 61 load the data D=Enc(K, $K_{PUF}$) obtained by encrypting the authentication key K stored in the non-secure area with the key $K_{PUF}$ into the module of this embodiment as the ciphertext, decode the data D into the authentication key K with K=Dec(D, $K_{PUF}$), and load the authentication key into the module of this embodiment as a key.

(Operation 5) The "additional modules for PUF & RNG" 62 perform the random number generation in the module of this embodiment, and output a generated random number R to the outside so as to be transmitted to an authentication destination.

(Operation 6) The "basic modules for AES" 61 perform encryption C=Enc(R, K) for the random number R.

(Operation 7) The "basic modules for AES" 61 compare data C' received from the authentication destination with C, and determine that the authentication is successful when there is a match therebetween, while the authentication is unsuccessful when there is a mismatch therebetween.

Figure 8:
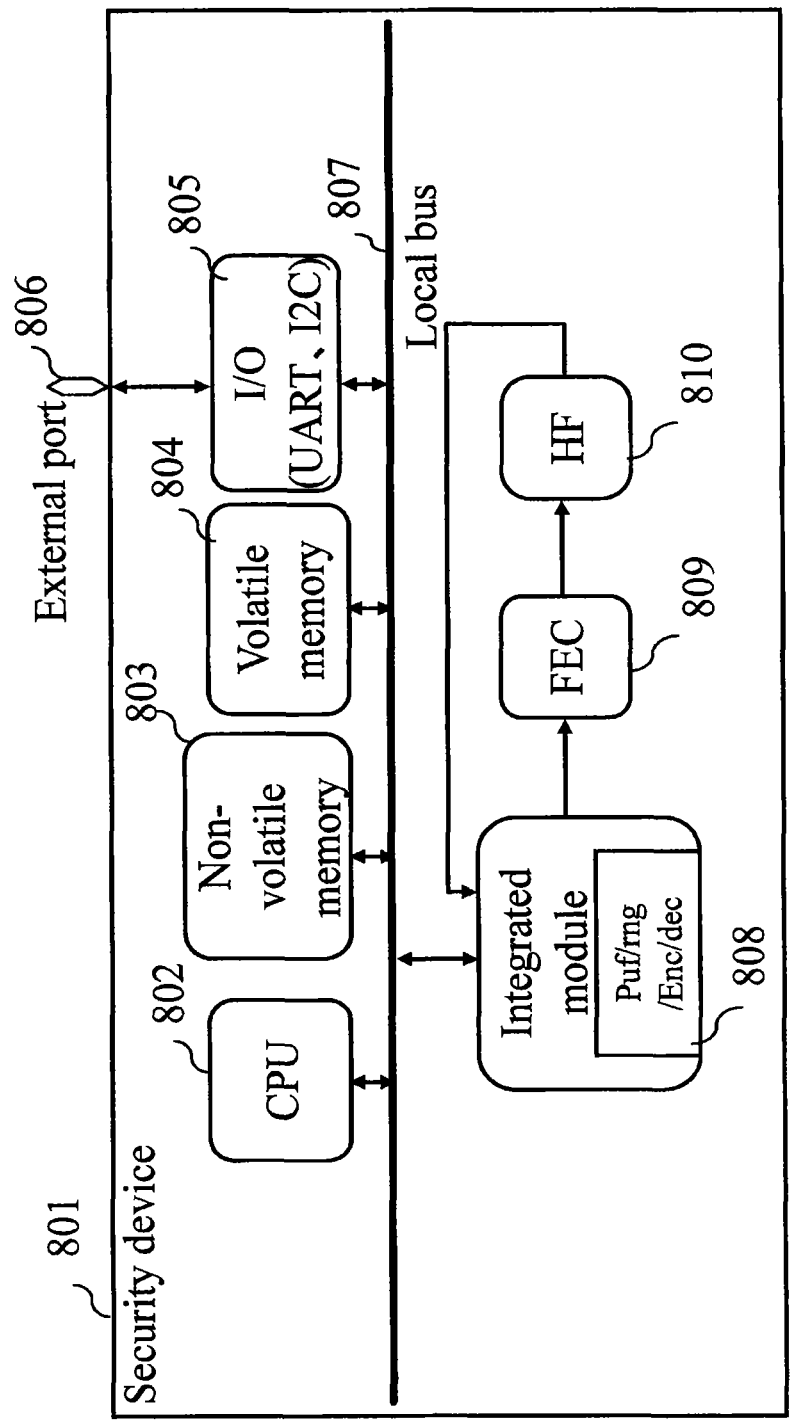
FIG. 8 is a hardware architecture for implementing the authentication function according to the fifth embodiment of the present invention.

FIG. 8 is a hardware architecture for implementing the authentication function according to the first to fifth embodiments of the present invention. As illustrated in FIG. 8, a security device 801 according to the present invention uses any one of the integrated security devices described in the respective embodiments as an integrated module 808. Further, the integrated module 808 is connected to a CPU 802, memories 803 and 804, and an I/O 805 via a local bus 807. In addition, this integrated module 808 is connected to an HF 810 via an FEC 809. The integrated security device according to the present invention can be embodied as such a hardware configuration illustrated in FIG. 8.

Note that, the present invention is not limited to the above-mentioned first to fifth embodiments. In other words, the present invention can be carried out by changing a component without departing from the gist thereof. Further, various inventions can be formed by appropriately combining the plurality of components disclosed in the above-mentioned first to fifth embodiments. In addition, some components may be deleted from all the components illustrated in the first to fifth embodiments. In addition, the components may be combined appropriately over different embodiments.

The invention claimed is:

1. An integrated security device, comprising:
an encryption/decoding processing circuit configured to execute processing necessary for authentication by using a logic circuit that forms an encryption/decoding function;
a selection circuit configured to select signals whose number corresponds to a specific number of lines from among signals from a plurality of intermediate nodes of the logic circuit in accordance with a selection signal; and
a signal processing circuit configured to
supply the selection circuit with the selection signal for selectively executing a function of generating a physical random number or a function of generating a physical unclonable function (PUF) response,
detect a glitch caused by the signals corresponding to the specific number of lines selected by the selection circuit in accordance with the selection signal, and
execute the function of generating the physical random number and the function of generating the PUF response based on the glitch detected in accordance with the signals corresponding to the specific number of lines selected based on the selection signal.

2. The integrated security device according to claim 1, wherein:
the encryption/decoding function is formed of iterative processing of sub-functions; and
the signal processing circuit is configured to acquire input information necessary for the function of generating the PUF response by selecting the signals corresponding to the specific number of lines from among signals updated by the iterative processing by supplying the selection circuit with the selection signal.

3. The integrated security device according to claim 1, further comprising a key generator configured to protect a key necessary for the authentication by the PUF response generated by the signal processing circuit, and to generate challenge data necessary for the authentication by the generated physical random number,
wherein the encryption/decoding processing circuit is further configured to acquire the key and the challenge data from the key generator, and to process an authentication protocol by performing encryption/decoding processing necessary for the authentication.

4. The integrated security device according to claim 2, further comprising a key generator configured to protect a key necessary for the authentication by the PUF response generated by the signal processing circuit, and to generate challenge data necessary for the authentication by the generated physical random number,
wherein the encryption/decoding processing circuit is further configured to acquire the key and the challenge data from the key generator, and to process an authentication protocol by performing encryption/decoding processing necessary for the authentication.

5. The integrated security device according to claim 1, wherein:
the encryption/decoding processing circuit comprises a divided sub-function for executing processing in units divided by N, where N represents an integer equal to or greater than two, as one given sub-function that forms the encryption/decoding function;
the selection circuit comprises a switching circuit configured to feed back an output from an n-th division of the divided sub-function to an input to (n+1)th division of the divided sub-function, where n represents an integer equal to or greater than one and equal to or smaller than (N−1), in accordance with the selection signal; and
the signal processing circuit is configured to output the selection signal that corresponds to forming the switching circuit for feeding back when implementing the function of generating the physical random number, and to output the selection signal that corresponds to avoiding forming the switching circuit for feeding back when implementing the function of generating the PUF response.

6. The integrated security device according to claim 2, wherein:
the encryption/decoding processing circuit comprises a divided sub-function for executing processing in units divided by N, where N represents an integer equal to or greater than two, as one given sub-function that forms the encryption/decoding function;
the selection circuit comprises a switching circuit configured to feed back an output from an n-th division of the divided sub-function to an input to (n+1)th division of the divided sub-function, where n represents an integer equal to or greater than one and equal to or smaller than (N−1), in accordance with the selection signal; and
the signal processing circuit is configured to output the selection signal that corresponds to forming the switching circuit for feeding back when implementing the function of generating the physical random number, and to output the selection signal that corresponds to avoiding forming the switching circuit for feeding back when implementing the function of generating the PUF response.

7. The integrated security device according to claim 3, wherein:
the encryption/decoding processing circuit comprises a divided sub-function for executing processing in units divided by N, where N represents an integer equal to or greater than two, as one given sub-function that forms the encryption/decoding function;
the selection circuit comprises a switching circuit configured to feed back an output from an n-th division of the divided sub-function to an input to (n+1)th division of the divided sub-function, where n represents an integer equal to or greater than one and equal to or smaller than (N−1), in accordance with the selection signal; and the signal processing circuit is configured to output the selection signal that corresponds to forming the switching circuit for feeding back when implementing the function of generating the physical random number, and to output the selection signal that corresponds to avoiding forming the switching circuit for feeding back when implementing the function of generating the PUF response.

8. The integrated security device according to claim 4, wherein:

the encryption/decoding processing circuit comprises a divided sub-function for executing processing in units divided by N, where N represents an integer equal to or greater than two, as one given sub-function that forms the encryption/decoding function;

the selection circuit comprises a switching circuit configured to feed back an output from an n-th division of the divided sub-function to an input to (n+1)th division of the divided sub-function, where n represents an integer equal to or greater than one and equal to or smaller than (N−1), in accordance with the selection signal; and the signal processing circuit is configured to output the selection signal that corresponds to forming the switching circuit for feeding back when implementing the function of generating the physical random number, and to output the selection signal that corresponds to avoiding forming the switching circuit for feeding back when implementing the function of generating the PUF response.

9. The integrated security device according to claim 1, wherein the signal processing circuit is further configured to perform processing for generating the physical random number based on a transition state in repeatedly reading a signal having a predetermined bit transition probability a predetermined number of times via the selection circuit.

10. The integrated security device according to claim 2, wherein the signal processing circuit is further configured to perform processing for generating the physical random number based on a transition state in repeatedly reading a signal having a predetermined bit transition probability a predetermined number of times via the selection circuit.

11. The integrated security device according to claim 3, wherein the signal processing circuit is further configured to perform processing for generating the physical random number based on a transition state in repeatedly reading a signal having a predetermined bit transition probability a predetermined number of times via the selection circuit.

12. The integrated security device according to claim 4, wherein the signal processing circuit is further configured to perform processing for generating the physical random number based on a transition state in repeatedly reading a signal having a predetermined bit transition probability a predetermined number of times via the selection circuit.

13. The integrated security device according to claim 1, wherein:

the encryption/decoding function is formed of a plurality of logic stages, the encryption/decoding function comprising at least a first sub-function that forms a logic circuit on a first stage and a second sub-function that forms a logic circuit on a second stage; and the signal processing circuit is configured to supply the selection circuit with the selection signal that corresponds to selecting an output signal from the first sub-function when implementing the function of generating the PUF response, and to supply the selection circuit with the selection signal that corresponds to selecting an output signal from the second sub-function when implementing the function of generating the physical random number.

14. The integrated security device according to claim 2, wherein:

the encryption/decoding function is formed of a plurality of logic stages, the encryption/decoding function comprising at least a first sub-function that forms a logic circuit on a first stage and a second sub-function that forms a logic circuit on a second stage; and the signal processing circuit is configured to supply the selection circuit with the selection signal that corresponds to selecting an output signal from the first sub-function when implementing the function of generating the PUF response, and to supply the selection circuit with the selection signal that corresponds to selecting an output signal from the second sub-function when implementing the function of generating the physical random number.

15. The integrated security device according to claim 3, wherein:

the encryption/decoding function is formed of a plurality of logic stages, the encryption/decoding function comprising at least a first sub-function that forms a logic circuit on a first stage and a second sub-function that forms a logic circuit on a second stage; and the signal processing circuit is configured to supply the selection circuit with the selection signal that corresponds to selecting an output signal from the first sub-function when implementing the function of generating the PUF response, and to supply the selection circuit with the selection signal that corresponds to selecting an output signal from the second sub-function when implementing the function of generating the physical random number.

16. The integrated security device according to claim 4, wherein:

the encryption/decoding function is formed of a plurality of logic stages, the encryption/decoding function comprising at least a first sub-function that forms a logic circuit on a first stage and a second sub-function that forms a logic circuit on a second stage; and the signal processing circuit is configured to supply the selection circuit with the selection signal that corresponds to selecting an output signal from the first sub-function when implementing the function of generating the PUF response, and to supply the selection circuit with the selection signal that corresponds to selecting an output signal from the second sub-function when implementing the function of generating the physical random number.

17. A signal processing method for an integrated security device, comprising:

an encryption/decoding processing of executing processing necessary for authentication by using a logic circuit that forms an encryption/decoding function;

supplying a selection circuit with a selection signal for selectively executing a function of generating a physical random number or a function of generating a physical unclonable function (PUF) response;

selecting, by the selection circuit, signals whose number corresponds to a specific number of lines from among signals from a plurality of intermediate nodes of the logic circuit in accordance with the selection signal;

detecting a glitch caused by the selected signals corresponding to the specific number of lines selected by the selection circuit in accordance with the selection signal; and executing the function of generating the physical random number and the function of generating the PUF response based on the glitch detected in accordance with the signals corresponding to the specific number of lines selected based on the selection signal.

* * * * *